D7-354 AU 293 EX
N0027 OR RD 15,056

DESIGN.

J. BEISWANGER.

BEAN POT AND COVER.

APPLICATION FILED DEC. 3, 1920

Reissued Mar. 8, 1921. 15.056

John Beiswanger

By Edwin Hammond

UNITED STATES PATENT OFFICE.

JOHN BEISWANGER, OF STEUBENVILLE, OHIO, ASSIGNOR TO GILL BROTHERS COMPANY, OF STEUBENVILLE, OHIO, A CORPORATION OF WEST VIRGINIA.

DESIGN FOR A BEAN-POT AND COVER.

15,056. Specification for Reissued Design. Reissued Mar. 8, 1921.

Original No. 56,336, dated October 5, 1920, Serial No. 334,859, filed October 31, 1919, for 7 years. Application for reissue filed December 3, 1920. Serial No. 428,179. Term of patent 14 years.

*To all whom it may concern:*

Be it known that I, JOHN BEISWANGER, a citizen of the United States of America, and resident of Steubenville, county of Jefferson, State of Ohio, have invented a certain new, original, and ornamental Design for a Bean-Pot and Cover, of which the following is a specification.

In the accompanying drawing I have illustrated a bean pot and cover, constructed in accordance with my invention, the article being made of resistive transparent glass.

Figure 1:
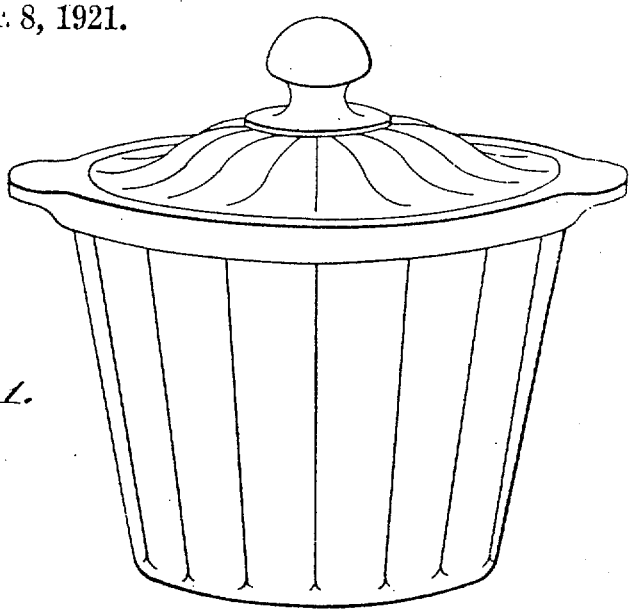

In the drawing Figure 1 is a perspective taken from the side of a bean pot and cover showing my new design.

Figure 2:
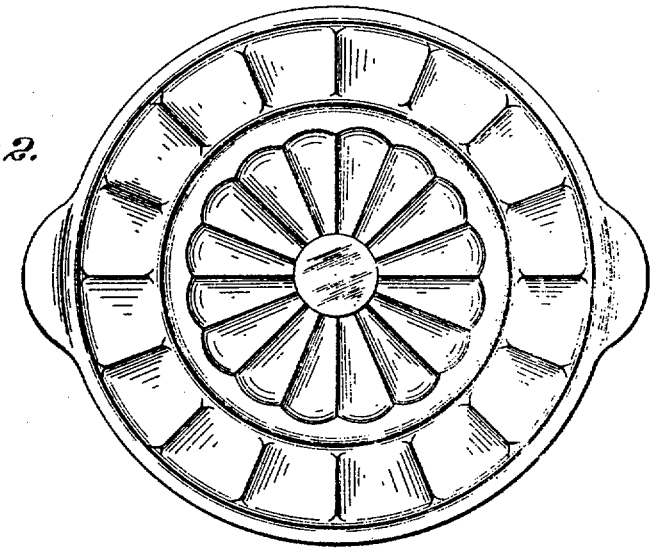

Fig. 2 is a top plan of the cover.

Having thus described and illustrated my invention, I claim:

The ornamental design for a bean pot and cover, substantially as shown and described.

Signed by me at Steubenville, Jefferson county, Ohio, this 24th day of November, 1920.

JOHN BEISWANGER.

Witnesses:
M. S. BRAND,
W. R. PATTERSON.